United States Patent

Pilhofer

[11] 3,818,200
[45] June 18, 1974

[54] METHOD FOR MEASURING THE SIZE OF THE DISPERSE ELEMENTS IN A FLUID IMMISCIBLE TWO-PHASE SYSTEM

[76] Inventor: Theo Pilhofer, Georgerstr. 105, 8 Munich 13, Germany

[22] Filed: Jan. 2, 1973

[21] Appl. No.: 320,664

[30] Foreign Application Priority Data
Jan. 13, 1972  Germany............................ 2201507

[52] U.S. Cl. .......... 235/151.3, 73/194 E, 324/71 R, 356/102
[51] Int. Cl. ........................... G06g 7/57, G01f 1/00
[58] Field of Search....... 235/151.3, 151.34, 151.35; 73/194 E, 196; 250/218; 324/71 R, 71 CP; 356/102, 157

[56] References Cited
UNITED STATES PATENTS

| | | | |
|---|---|---|---|
| 3,208,286 | 9/1965 | Richard | 235/151.32 X |
| 3,403,554 | 10/1968 | Chevalier | 324/71 R X |
| 3,403,555 | 10/1968 | Versaci et al. | 73/194 E |
| 3,581,071 | 5/1971 | Payseure | 235/151.32 |
| 3,588,699 | 6/1971 | Pysnik | 73/194 E X |
| 3,621,710 | 11/1971 | Day et al. | 73/194 E |
| 3,635,082 | 1/1972 | Prellwitz et al. | 73/194 E X |
| 3,739,180 | 6/1973 | Carlson | 356/102 X |

Primary Examiner—Malcolm A. Morrison
Assistant Examiner—Jerry Smith
Attorney, Agent, or Firm—Hammond & Littell

[57] ABSTRACT

A method for measuring the size of the disperse elements in a fluid immiscible two-phase system comprising separating a partial stream from the two-phase mixture to be investigated, passing it through a capillary past a first sensing means and then past a second sensing means, said first and second sensing means generating signals lasting from the beginning to the end of each plug or discrete portion of laminar flow flowing through the capillary, the velocity of each plug being determined by the distance between said first and second sensing means and the time lag between said sensing signals. In a preferred embodiment, the actual cross section of the plugs is measured by the plug velocity with the aid of constants specific to the system and finally, the volume of each plug is determined from its cross section and its length, the latter being calculated from its velocity and from the duration of one of said sensing signals. Also, an apparatus for performing the method comprising a transparent capillary having a funnel shaped enlargement at its end, and being connected with a circumferential support means, a tube having inserted into one end thereof said support means, and having arranged therein a detection block containing said sensing means, a spacing means and a cable duct.

15 Claims, 11 Drawing Figures

METHOD FOR MEASURING THE SIZE OF THE DISPERSE ELEMENTS IN A FLUID IMMISCIBLE TWO-PHASE SYSTEM

STATE OF THE ART

In chemical engineering, there are many operations known in which a fluid phase is dispersed in a liquid, for example liquid-liquid extraction or direct heat transfer between two liquids. Systems with dispersed gas in a fluid are well-known in connection with chemical reactions like hydrogenation or separating processes such as absorption or rectification.

Normally the dispersion contains a mixture of bubbles or drops whose size is statistically distributed. The size of the single elements of the dispersed phase is a typical characteristic of the said operations and the knowledge of the size distribution of the dispersed phase is very important and at least an average diameter of the bubbles or drops should be known.

For the following reasons, it is possible to conclude from the size distribution a process progress: Hydrodynamics of a fluid disperse two-phase system depend considerably on the size of the single disperse elements. For exact calculation of the residence time of the dispersed phase, it is necessary to know the size distribution of the bubbles or drops, respectively. Furthermore, the interfacial area which must be known for the calculation of transport processes is equal to the sum of the surfaces of all disperse elements and this interfacial area can only be calculated, if the size distribution is known. Since no reliable method has been known for theoretically calculating size distribution, there is considerable interest in appropriate measuring methods.

A known measuring method determines the size distributions of drops or bubbles photographically. However, this method requires a very troublesome evaluation and does not give enough information with regard to the statistical nature of the variables to be investigated. Furthermore, in cases where the process must not be disturbed, it can only be used near the wall of a vessel.

In drop size determination, a method for measuring the volume is known utilizing electrical resistance alteration of the continuous phase during the presence of a drop in the measuring electrode (Coulter-Counter), but this apparatus only works if the continuous phase is conductive. Moreover, measurement within a vessel is impossible because a partial stream of the mixture to be investigated must be led to the measuring cell. This fact limits the range of use to maximum drop diameters of 100 microns as otherwise the drops will coalesce.

A method for measuring bubble size distributions is also known (Chem. Eng. Techn. 43 (1971) 337/343) by sucking rising bubbles off the mixture to be analyzed through a vertical funnel connected with a capillary by means of a water jet pump. Depending on whether a bubble or bulk liquid is in the glass capillary, a light beam originating from a lamp and being received by a phototransistor is attenuated differently. With this method, it is assumed that the interval of the light attenuation is proportional to bubble volume and the actual size is further processed electronically. However, this assumption presumes that the cross section and the velocity of every bubble is independent of all other variables and that the vacuum at the capillary remains constant.

OBJECTS OF THE INVENTION

It is an object of the invention to provide a measuring method of size of plugs of laminar flow of a two-phase fluid system which is extremely accurate and trouble-free and may be carried out at any location within the vessel; covers a large scope of bubble or drop diameters, particularly diameters greater than 1 mm and permits high frequency of individual measurements and generates an electrical signal for easy subsequent processing.

It is a further object of the invention to provide an apparatus for the optimum performance of the said method, and which can be easily and economically manufactured.

These and other objects and advantages of the invention will become obvious from the following detailed description.

THE INVENTION

The method of the invention for measuring the size of the disperse elements in a fluid immiscible two-phase system comprises separating a partial stream from the mixture to be investigated, transforming the disperse elements contained therein into plugs and passing said plugs through a capillary past a first sensing means generating a signal lasting from the beginning to the end of the corresponding plug, determining the size of the plug from its length and from the cross section of the capillary by the duration of the signal, then passing the said plug past a second sensing means generating a second signal lasting from the beginning to the end of said plug, determining from the distance between said sensing means and the time lag between said first signal and said second signal the velocity of each plug, and calculating from the velocity of each plug and from the duration of one of said signals generated thereby the length of each plug.

A specific advantage of the invention as against known methods consists in a fundamental increase of measuring accuracy. With the present method, the velocity of each element of the disperse phase in the capillary is measured, so that it is possible to compensate electrically its influence on other parameters. This is important mainly with respect to the cross section of the bubbles or drops in the capillary, because this cross section is not identical to the cross section of the capillary, contrary to what was expected primarily. Furthermore, it is possible to process the sensing signals simultaneously by analog components, and so there is practically no dead or lost time in which further measurements are impossible.

The invention further provides an apparatus for performing the method according to the invention characterized by a transparent, i.e., glass, capillary having a funnel shaped enlargement at its inlet end and being connected with a circumferential support means, a tube having inserted into one end thereof said support means, and having arranged therein a detection block containing said sensing means, a spacer means and a cable duct.

The said apparatus is very compact and causes no significant disturbances at the measuring location and can be economically and simply manufactured. Moreover, the said apparatus constitutes an assembly of prefabricated parts so that it is possible to replace significant parts, like the capillary, within a short time.

Referring now to the drawings:

FIG. 1 comprised of FIGS. 1a and 1b show a schematic illustration of one embodiment of the measuring apparatus of the invention and a time-voltage graph of the generated signals;

With the known method for the measurement of a bubble size distribution, it has been supposed that the cross section of the bubble, which is transformed in the capillary into a plug, is equal to the cross section of the capillary. Furthermore it has been supposed that plugs of different length always have the same velocity. Only with these assumptions does a proportionality exist between the volume of the measured bubbles and the length of the signal which is delivered by the light receiving system.

However, detailed investigations have proved that the plugs when streaming in the capillary have different velocities and this fact is used in the method of the invention.

Figures 1, 1A, 1B:
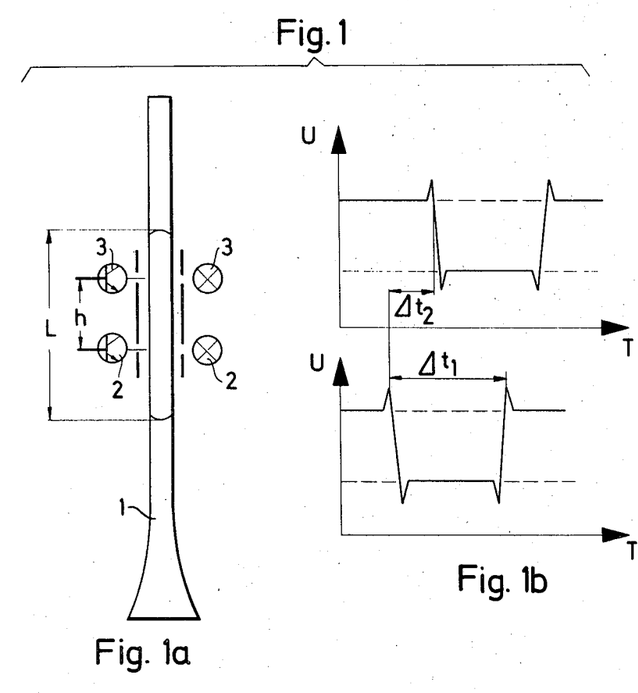

The principal version of the present method or measuring consists of the following essential steps using FIG. 1: Withdrawing a partial stream of the mixture under investigation and passing it through a capillary 1 accompanied by a conversion of the bubbles or drops contained therein into plugs, passing the plugs separately one after another past a first sensing means 2 to generate a first signal lasting from the beginning to the end of the corresponding plug, passing the said plug past a second sensing means 3 to generate a second signal lasting from the beginning to the end of said plug, calculating the velocity of each plug from the distance of said first and second sensing means and the time lag between said first and second signals, and determining the length of each plug from its velocity and the duration of one of said signals. The volume of each plug, respectively each drop or bubble, can be determined if the cross section of the plug is known and with the principal embodiment of the method, the cross section of the plug is equal to the cross section of the capillary.

Furthermore, it has been proven that both bubbles in a gas/liquid system and drops in a liquid/liquid system are surrounded in the capillary by a film of the homogeneous phase and its thickness changes with plug velocity. A still more accurate measurement of the volume is therefore possible, if besides the velocity of each plug the actual cross section of the plug is measured, too.

In an especially preferred version of the method of the invention, an additional measurement of the actual cross section of the plug is effected prior to the real measurement by determining by experiment the constants a and b of the function.

$$A = f(a,b,w)$$

for the system under investigation, that holds generally for the relation between the actual cross section of plug A and the actual plug velocity w, and measuring the actual cross section A of the plug with help of these specific constants and the plug velocity w.

The method of the invention will be explained subsequently with reference to said especially preferred version. Two equal sensing means are mounted on the capillary at a distance h. FIG. 1 indicates that the signals appear on the two sensing means having the same shape (duration $\Delta t_1$) but being delayed by $\Delta t_2$ at the second sensing means.

With these sensing means signals, it is possible to calculate the volume of the measured disperse elements in the following manner: The plugs in the capillary have the length L and the cross section A. From this follow:

$$V = L \cdot A \qquad (1)$$

The length of the plugs may be expressed $$L = W \cdot \Delta t_1 \qquad (2)$$

wherein $w$ is the plug velocity and $\Delta t_1$ the duration of a signal.

The plug velocity comes to:

$$w = h / \Delta t_2 \qquad (3)$$

wherein $h$ is the distance of the two sensing means and $\Delta t_2$ the transit time of the plug between these two sensing means.

The cross section of the plug is related to a calibration cross section $A_N$ and can be stated as a fucntion of the actual plug velocity w related to the calibration velocity $w_N$ in the following manner:

$$A/A_N = a \cdot (1 - (w/w_N) \cdot b) \qquad (4)$$

The specific constants $a$ and $b$ which must be determined experimentally hold for one system. The linear relation is valid for many disperse systems and includes the experimentally determined relationship between the cross section and the velocity.

From equations (1) through (4) follows:

$$V = A_N \cdot a \cdot h \cdot [(\Delta t_1/\Delta t_2) - (b/w_N) \cdot {}^{\iota}\Delta t_1/(\Delta t_2)2)] \qquad (5)$$

While streaming through the capillary, the plug normally has a convex head and the plug tail has a convex curvature which decreases with increasing plug velocity. If the plug velocity increases even more, the plug tail is laced whereby the plug becomes unstable and finally breaks up which leads to incorrect measurements. It has been determined that the maximum admissible plug velocity in the capillary can be stipulated from the interpretation of the sensing signals, as direct inferences may be drawn about the condition of the passing plug from their shape. This has been demonstrated with the use of phototransistors as sensing means and lamps for signal generation.

Figure 2A:
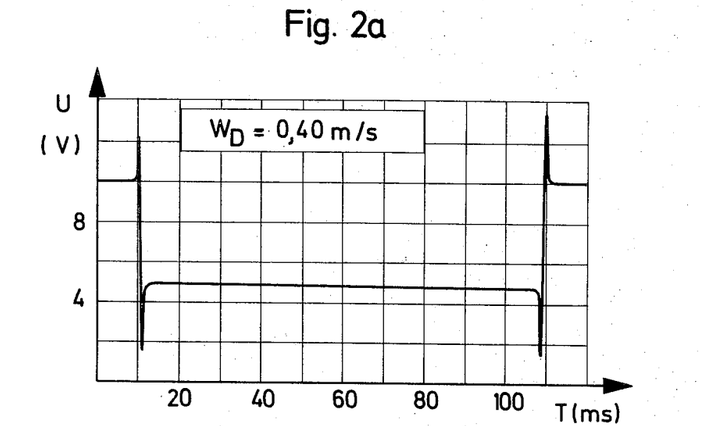
FIGS. 2a, b, c, d are time-voltage graphs of different signals generated by the apparatus of one embodiment of the invention.

FIGS. 2a, b, c, d are time-voltage graphs of four signals produced by the same plug at different plug velocities in the capillary. The voltage peaks at the beginning are characteristic of these signals. They are caused by the focusing effect of the convex plug head and by the different indices of refraction of the glass capillary, the disperse phase, and the continuous phase. When the plug head passes the sensing means, there is at first an instantaneous darkening that causes the positive voltage peak and immediately afterwards, a focusing of the light beam follows. There is an instantaneous increase of light intensity on the phototransistor and the second negative voltage peak occurs.

Figure 2B:
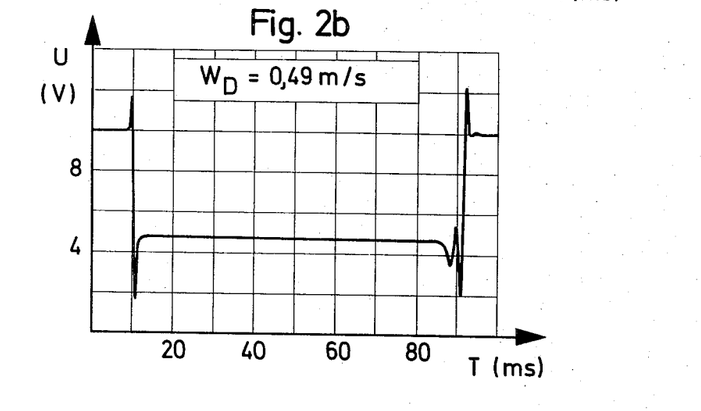
Figure 2C:
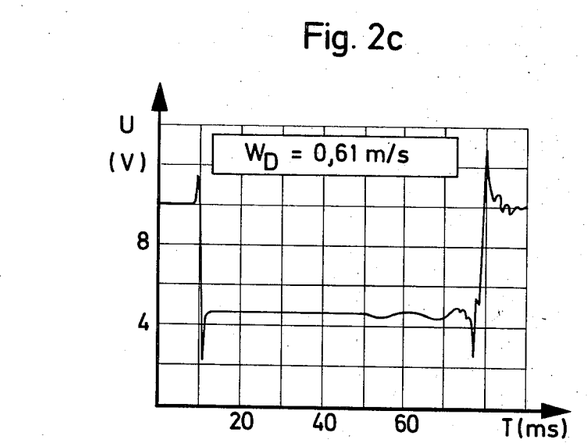
Figure 2D:
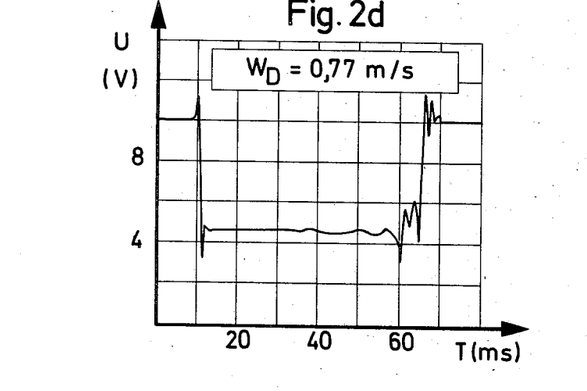

If these relations are known, it is possible to deduce from the signal shape criteria for the stability of the plug and the control of the plug velocity. If the voltage peaks are homologous as FIG. 2a, a convex plug tail exists. A double appearance as in FIG. 2b indicates a flattening of the plug tail. A laced plug tail causes a signal as indicated in FIG. 2c. Voltage fluctuations occur soon after the beginning of the signal; moreover, the voltage peaks at the end of the signal are superposed by fluctuations. A signal as shown in FIG. 2d indicates that there may already be detached pieces.

Based on these effects there is a possibility for control of the plug velocity by permitting: Only measurements with the signal shapes of FIGS. 2a, b. It is important that the U-shaped signals of the first sensing means 2 of FIG. 1 are symmetrical according to the legs of the U. This indicates that the plug has a convex head and tail. Furthermore, it was found that a rippled condition of the traverse of the U should be avoided as far as possible. If the greater part of the traverse gets rippled, a detaching must be expected and therefore the plug velocity in the capillary must be lower than this critical velocity according to this signal shape.

Figure 3:
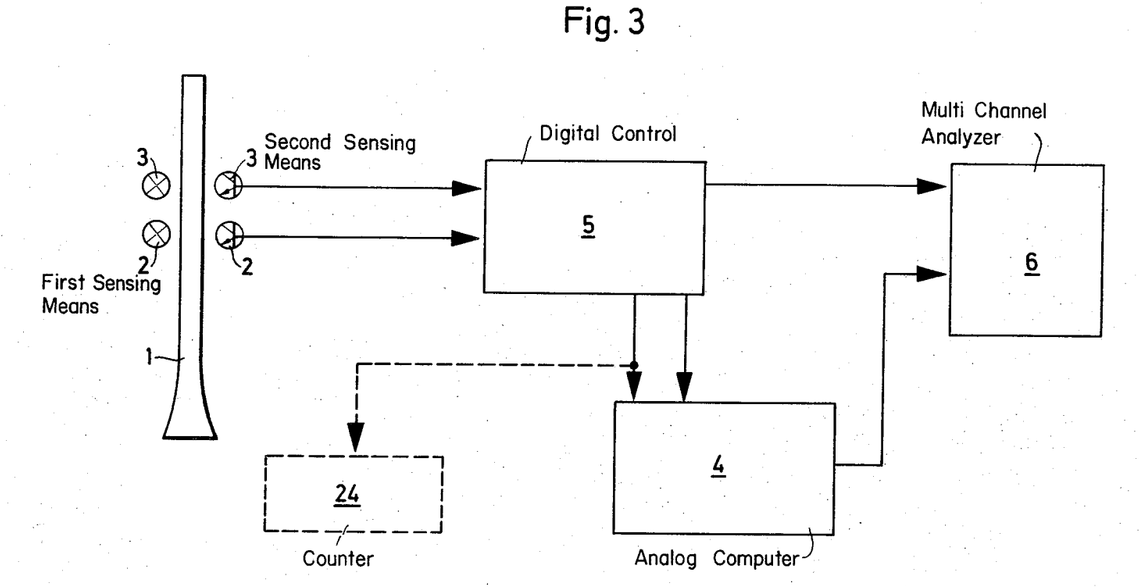
FIG. 3 is a schematic illustration of the analog processing of the signals generated.

In connection with a further advantageous version of the present method illustrated in FIG. 3, the generated sensing signals are processed in an analog computer 4, which is controlled by digital control part 5 and the evaluation takes place in a multichannel analyzer. In the analog computer 4, the volume of the bubbles or drops is represented by direct voltage in FIG. 4. For this purpose, the times $\Delta t_1$ and $\Delta t_2$, the respective signals of FIG. 1, are transformed into proportional direct voltages by integrators 7 and 8, the constants of proportionality being set by the potentiometers 9 and 10. These voltages proportional to the times $\Delta t_1$ and $\Delta t_2$ are processed in the analog computer 4 according to equation (5) above. At the output of the summing amplifier 11 of the analog computer 4, the direct voltage proportional to volume V is present.

Figure 5:
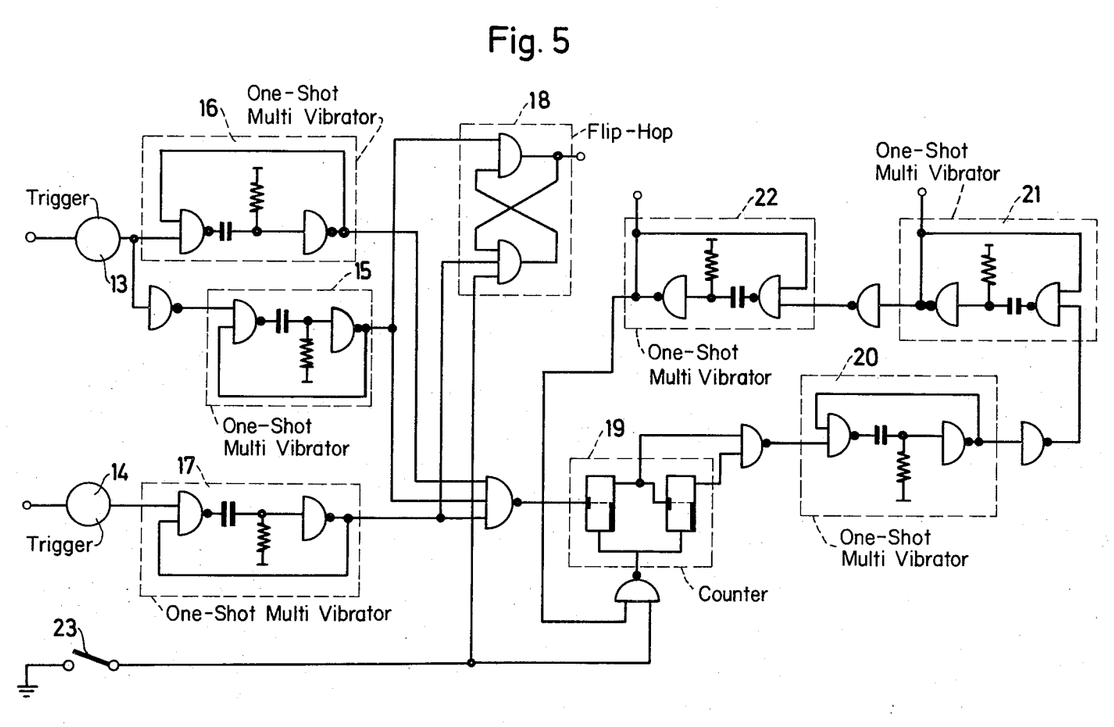
FIG. 5 is a schematic illustration of the digital control of the analog processing of the signals generated.

The analog computer 4 is controlled by digital control part 5 of FIG. 3 which works as follows in FIG. 5: The two signals of the sensors $\Delta t_1$ and $\Delta t_2$ are transformed into square waves by triggers 13 and 14. To indicate the beginning and the end of the triggered sensing signal $\Delta t_1$ and the beginning of the triggered sensing signal $\Delta t_2$, very short impulses are generated at the corresponding sides or slopes of the signals by one-shot multivibrators 15, 16, 17. These pulses mark three important moments of one cycle of measurement and allow control of further processing of the sensing signal in analog computer 4. Said processing comprises transforming the sensing signals $\Delta t_1$ and $\Delta t_2$ into proportional direct voltages, calculating the direct voltage proportional to the volume, and starting the analysis of this voltage by multichannel analyzer 6.

The control of integrator 7 for the conversion of $\Delta t_1$ into a proportional direct voltage is effected via the output of trigger 13. The signal for the control of integrator 8 (conversion of $\Delta t_2$) is generated by a flip-flop 18 set and reset by the output of one-shot 15 and one-shot 17. Subsequent to the conversion, both integrators hold the resulting voltage.

As both times $\Delta t_1$ and $\Delta t_2$ are of different duration, their conversion into direct voltages is finished at different times. The direct voltage proportional to the volume of the bubble or the drop is available at the output of the summing amplifier 11 of FIG. 4 when both time-voltage conversions are finished. Yet the sequence of the ending of both conversions may be different. This depends on whether the plug which is to be measured is longer or shorter than the distance of the sensors h.

In the embodiment of the control part of the invention, the end of both time-voltage conversions is detected by counting the needle impulses of one-shots 15, 16, and 17. These impulses represent marks for the beginning common to both conversions, the end of the conversion of $\Delta t_1$, and the end of the conversion of $\Delta t_2$. Therefore, a cycle of measurement is finished when these three one-shots have generated three pulses together. This fact is independent of the pulse sequence.

For this purpose the outputs of one-shots 15, 16 and 17 are connected with a gate and the gate output is counted by a counter 19. When it has counted to three, the measurement of one drop or bubble is finished and one-shot 20 generates a pulse which causes the multichannel analyzer 6 of FIG. 3 to analyze and classify the output of the summing amplifier 11. Afterwards, one-shot 21 generates a pulse for resetting the integrators to the initial condition zero and thereafter a pulse from one-shot 22 follows to reset counter 19 to zero. At this time, one measuring cycle is completed and another one can start. Before the first measurement, it is still necessary to set flip-flop 18 and counter 19 and this is done by switch 23.

The calibration of the apparatus can be carried out advantageously in two subsequent steps: First, the relation between bubble volume or drop volume and registration channel of the multichannel analyzer is determined keeping constant the plug velocity in the capillary. Afterwards, the adjustment of the electrical compensation of deviations of the plug velocity from the calibration velocity takes place.

The velocity in the capillary which is to be used as the basis for measuring results from the above-mentioned relation between the shape of the sensing signal and the stability of the plug in the capillary. Potentiometer 10 is accordingly set so that this velocity corresponds to a voltage in the upper range of the admissible value of integrator 8. This is necessary in accordance with the performance of both the analog dividers of FIG. 4 because they require a denumerator greater than the numerator and are more accurate with a higher denumerator.

Figure 4:
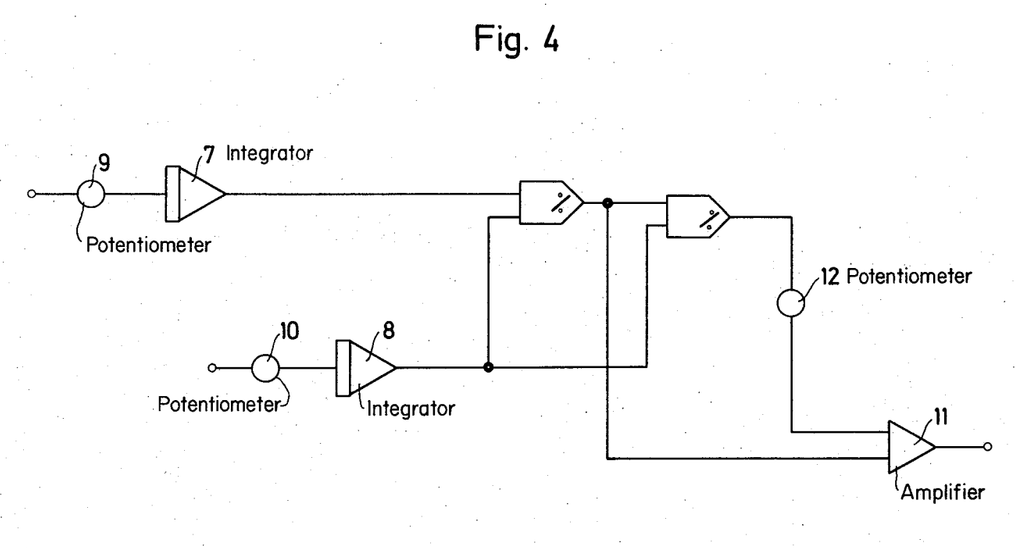
FIG. 4 is a schematic illustration of further analog processing of the signals generated.

The adjustment of potentiometer 9 of FIG. 4 is made by adaptation to the maximum bubble size or drop size which occurs. It is convenient, but not absolutely necessary, to take advantage of the maximum range of working of integrator 7, so that the largest appearing time $\Delta t_1$ corresponds to a voltage at the upper limit of the admissible working region.

The calibration takes place with bubbles or drops of known volume. According to their size, there is a registration in one channel of the multichannel analyzer and the plug velocity in the capillary, as determined before, is held constant because it has been proven that the cross section of the plug depends on the plug velocity. During this step of calibration, potentiometer 12 of the analog computer of FIG. 4 is set to zero.

The compensation of possible velocity differences in the capillary in connection with the measurement of many various-sized disperse elements is deduced from equation (4) which shows the relation between plug velocity and cross section of the plug. To do this, the specific constant $b$ in equation (4) must be adjusted so that for one bubble or one drop the same volume at different plug velocities in the capillary is always indicated. With the present measuring apparatus, this is carried out in the following manner: An equally sized bubble or drop is measured at different velocities and the potentiometer 12 of the analog computer of FIG. 4 which was set to zero during the preceding calibration section is adjusted so that the registration of the output of the summing amplifier 12 always takes place in the same channel of the multichannel analyzer. The compensation of plug velocity differences is completed for the whole range of measurement of the preceding calibration section.

In order to control the average plug velocity in the capillary, it is furthermore convenient to know the velocity in the capillary. As signal $\Delta t_2$ is a measure for this size, it is advantageous to complete the apparatus of FIG. 3 additionally by a counter 24 (dash-lined), that totals the duration of all signals $\Delta t_2$. It is possible to calculate from this result the average plug velocity in the capillary by dividing with the number of measured bubbles or drops.

Figure 6:
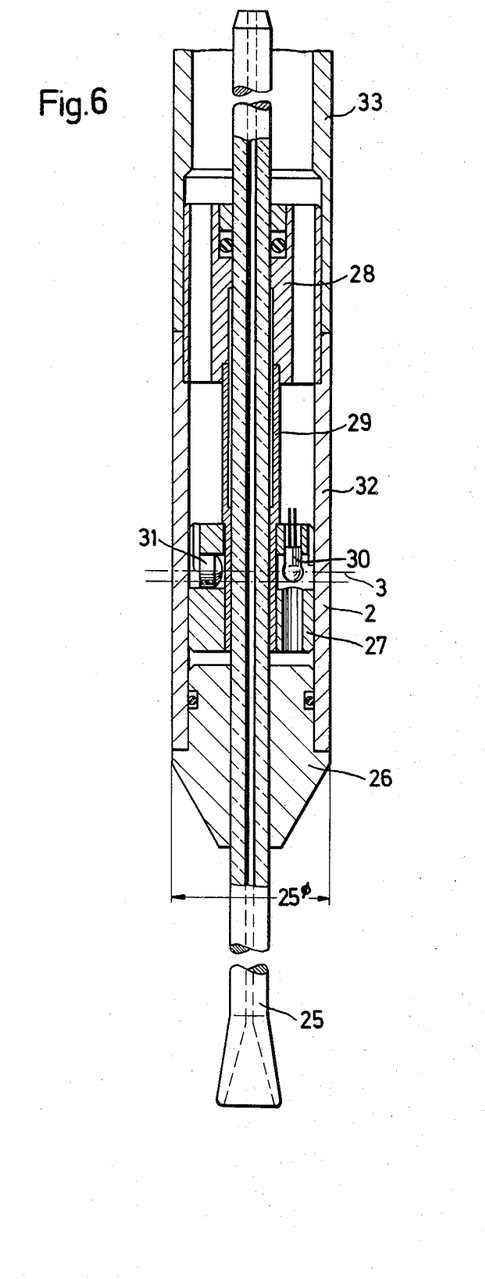
FIG. 6 is a cross section of a preferred embodiment of an apparatus for performing the method of the invention.

The assembly of a preferred apparatus for the performance of this method is shown in FIG. 6 but it is also possible to use other apparatus like radioactive radiation in connection with a metal capillary. The glass capillary 25 is connected with the outer cover 26 and the glass capillary is secured by the sensing block 27 and the cable duct 28 which are arranged at a constant distance by the bearing spacer 29. The sensing block 27 contains lamp 30 and the photosensitive element 31 and the light is partially faded out by bores in the bearing spacer 29 to get a well-focused light beam. The first light barrier 2 is in reverse order of 90° to the second one 3 to get a barrier distance as small as possible. The measuring section is sealed by tube 32 and the probe is held by trunk 33. Due to this construction, it is possible to replace the glass capillary 25 very quickly by a capillary with another diameter. Furthermore, this construction permits the replacement of the block of the light barriers by a spare-part.

The method of the invention can be conveniently used for measuring the flow rate of a continuous phase flowing through a capillary. If the cross section and the velocity of a disperse element flowing through the capillary are known, it is possible to calculate the velocity $w_K$ of the homogeneous phase by applying the continuity equation:

$$w \cdot A = w_K \cdot A_K \quad (6)$$

wherein $w_K$ means the velocity of the disperse element, A its cross section, and $A_K$ the cross section of the capillary.

The cross section A of the plug is the only unknown parameter in equation (6) because the plug velocity $w$ of the disperse element can be measured by the method of the invention. The relative size of A with regard to a calibration cross section $A_N$ can be meaured by applying one of the described embodiments of the present method. However, to determine its absolute value, it is necessary to make an additional calibration. Thus, bubbles or drops of known volume are measured in order to calculate the calibration cross section.

When the method of the invention is applied to the measurement of flow rates, firstly, the volume of a disperse element is measured and then, in a second step, the cross section of the plug of the now known volume is measured by the described mode of operation.

Measuring the flow rate requires an intermittent introduction of disperse elements into the stream in front of the measuring point.

The measurement of the cross section of the plug is carried out as follows: The quotient $b/w_N$ in equation (5) is set to zero by a suitable adjustment of potentiometer 12. If the volume V of the disperse element is known and the times $\Delta t_1$ and $\Delta t_2$ are measured, it is possible to calculate the cross section of the plug which in this case is equal to the calibration cross section $A_N$, because a is constant and the sensor distance $h$ is fixed being a geometrical length.

Various modifications of the method and apparatus of the invention may be made without departing from the spirit or scope thereof and it is to be understood that the invention is to be limited only as defined in the appended claims.

I claim:

1. A method for measuring the size of the disperse elements in a fluid immiscible two-phase system comprising separating a partial stream from the mixture to be investigated, transforming the disperse elements contained therein into plugs and passing said plugs through a capillary past a first sensing means generating a signal lasting from the beginning to the end of the corresponding plug, then passing the said plug past a second sensing means generating a second signal lasting from the beginning to the end of said plug, determining from the distance between said sensing means and the time lag between said first signal and said second signal the velocity of each plug, and calculating from the velocity of each plug and from the duration of one of said signals generated thereby the length of each plug.

2. The method of claim 1 wherein the constants ($a$, $b$) of the function:

$$A/A_N = a\,[1 - (w/w_N)\,b]$$

which holds for the relation between the actual cross section (A) of the plug and the plug velocity ($w$) measured and wherein the actual cross section (A) of the plug is related to a calibration cross section ($A_N$) and the plug velocity ($w$) measured is related to a calibration velocity ($w_N$), are experimentally determined by directly measuring the actual cross section (A) of the plug with constants ($a$, $b$) specific to the system via the plug velocity ($w$) measured and by using the actual cross section (A) measured instead of the cross section of the capillary.

3. The method of claim 2 wherein the velocity of said partial stream in the capillary is controlled at a maximum value so that most part of the horizontal traverse connecting the legs of the U-shaped pulse signal of the first sensor (2) does not show any waviness.

4. The method of claim 2 wherein the velocity of said partial stream in the capillary is controlled at a maximum value so that the U-shaped pulse signal is substantially symmetrical with the legs of the U.

5. The method of claim 2 wherein direct voltages are generated from the signal pulses generated by the sensing means by electrically integrating them with two integrators, one of said direct voltages being proportional to duration $\Delta t_1$ of the signal of the first sensor and the other being proportional to time delay $\Delta t_2$ of the beginning of the signal of the second sensor with respect to the beginning of the signal of the first sensor, said direct voltages generated are then processed in an analog computer according to the equation:

$$V = A_N \cdot a \cdot h \left[ (\Delta t_1/\Delta t_2) - (b/w_N) \cdot (\Delta t_1/\Delta t_2) 2) \right]$$

wherein $A_N$ is a calibration cross section;
$a$ is a constant specific to the system;
$h$ is the distance of the two sensors;
$b$ is a further constant specific to the system; and
$w_N$ is a calibration velocity;
and obtaining a direct voltage proportional to the plug volume at the output of said analog computer and analyzed in a multi-channel analyzer.

6. The method of claim 5 wherein said analog computer is controlled digitally by triggering both the U-shaped pulse signals to transform them into rectangular pulses, generating therefrom by logic interconnection a rectangular pulse with the duration $\Delta t_2$ i.e., the time delay between said U-shaped pulse signals and supplying said rectangular pulse corresponding to the duration $\Delta t_1$ of the first of said U-shaped pulse signals and said rectangular pulse corresponding to the time delay $\Delta t_2$ to the control inputs of said integrators respectively.

7. The method of claim 6 wherein at the beginning and at the end of said U-shaped pulse signal generated on said first sensing means and at the beginning of said U-shaped pulse signal generated by said second sensing means very short pulses are generated and counted by a counter according to their sequence of coming in.

8. The method of claim 7 wherein said counter counts to three independently of the sequence of the arriving short pulses and then an analysis of said direct voltage at the output of said analog computer by means of said multichannel analyzer is initiated.

9. The method of claim 5 wherein plugs of known volume are measured at constant velocity of said partial stream in the capillary, obtaining therefrom the relation between the plug volume and a registration channel of the multi-channel analyzer, then varying the velocity of said partial stream while measuring plugs of equal volume and setting a potentiometer in said analog computer so that at various velocities a minimum deviation of said registration channel of the multi-channel analyzer takes place.

10. The method of claim 1 wherein the velocity of said partial stream in the capillary is controlled at a maximum value so that most part of the horizontal traverse connecting the legs of the U-shaped pulse signal of the first sensor (2) does not show any waviness.

11. The method of claim 1 wherein the velocity of said partial stream in the capillary is controlled at a maximum value so that the U-shaped pulse signal is substantially symmetrical with the legs of the U.

12. The method of claim 1 wherein direct voltages are generated from the signal pulses generated by the sensing means by electrically integrating them with two integrators, one of said direct voltages being proportional to duration $\Delta t_1$ of the signal of the first sensor and the other being proportional to time delay $\Delta t_2$ of the beginning of the signal of the second sensor with respect to the beginning of the signal of the first sensor said direct voltages generated are then processed in an analog computer according to the equation:

$$V = A_N \cdot a \cdot h \cdot (\Delta t_1/\Delta t_2)$$

wherein $A_N$ is a calibration cross section;
$a$ is a constant specific to the system; and
$h$ is the distance of the two sensors;
and obtaining a direct voltage proportional to the plug volume at the output of said analog computer and anlayzed in a multi-channel analyzer.

13. The method of claim 12 wherein said analog computer is controlled digitally by triggering both the U-shaped pulse signals to transform them into rectangular pulses, generating therefrom by logic interconnection a rectangular pulse with the duration $\Delta t_2$, i.e., the time delay between said U-shaped pulse signals and supplying said rectangular pulse corresponding to the duration $\Delta t_1$ of the first of said U-shaped pulse signals and said rectangular pulse corresponding to the time delay $\Delta t_2$ to the control inputs of said integrators, respectively.

14. The method of claim 13 wherein at the beginning and at the end of said pulse signal generated by said first sensing means and at the beginning of said U-shaped pulse signal generated by said second sensing means very short pulses are generated and counted by a counter according to their sequence of coming in.

15. The method of claim 14 wherein said counter counts to three independently of the sequence of the arriving short pulses and then an analysis of said direct voltage at the output of said analog computer by means of said multichannel analyzer is initiated.

* * * * *